United States Patent
Meng et al.

(10) Patent No.: US 11,989,973 B2
(45) Date of Patent: May 21, 2024

(54) AGE AND GENDER ESTIMATION USING A CONVOLUTIONAL NEURAL NETWORK

(71) Applicant: Black Sesame International Holding Limited, San Jose, CA (US)

(72) Inventors: Meng Meng, Santa Clara, CA (US); Lei Zhang, Campbell, CA (US); Qun Gu, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 346 days.

(21) Appl. No.: 17/463,139

(22) Filed: Aug. 31, 2021

(65) Prior Publication Data

US 2023/0069436 A1    Mar. 2, 2023

(51) Int. Cl.
*G06V 40/16* (2022.01)
*G06N 3/08* (2023.01)

(52) U.S. Cl.
CPC ............ *G06V 40/172* (2022.01); *G06N 3/08* (2013.01); *G06V 40/165* (2022.01); *G06V 40/171* (2022.01); *G06V 40/178* (2022.01)

(58) Field of Classification Search
None
See application file for complete search history.

(56) References Cited

U.S. PATENT DOCUMENTS

| | | | | |
|---|---|---|---|---|
| 10,049,361 | B2* | 8/2018 | Kuntagod | G06Q 20/4016 |
| 2014/0172707 | A1* | 6/2014 | Kuntagod | G06Q 20/3224 |
| | | | | 705/44 |
| 2017/0092150 | A1* | 3/2017 | Aljahdali | G06V 40/172 |
| 2017/0351909 | A1* | 12/2017 | Kaehler | G06V 40/171 |
| 2023/0069436 | A1* | 3/2023 | Meng | G06V 40/171 |
| 2023/0177639 | A1* | 6/2023 | Chee | G06T 3/4046 |
| | | | | 382/100 |

OTHER PUBLICATIONS

Zhang, Chao, et al. "C3AE: Exploring the limits of compact model for age estimation." Proceedings of the IEEE Conference on Computer Vision and Pattern Recognition. 2019.

* cited by examiner

*Primary Examiner* — Tahmina N Ansari
(74) *Attorney, Agent, or Firm* — Timothy T. Wang; Ni, Wang & Massand, PLLC

(57) ABSTRACT

A method of age and gender estimation, comprising receiving an input image, detecting a facial image within the input image, estimating a head pose based on a set of facial image intensities of the facial image, wherein the head pose is expressed as a yaw, a pitch and a roll, determining whether the yaw, the pitch and the roll of the head pose is less than a predetermined threshold, aligning the facial image if the yaw, the pitch and the roll of the head pose are less than the predetermined threshold and predicting an age and a gender of the aligned facial image.

11 Claims, 8 Drawing Sheets

| Backbone | Dropout | Age distribution representation | W1 loss function | Training age | Validation age | Gender accuracy |
|---|---|---|---|---|---|---|
| plain-shared | yes | two points | focal loss | 5.7 | 5.5 | 0.95 |
| plain-shared | deleted | two points | focal loss | 4.4 | 5.3 | 0.92 |
| ResNet50 | deleted | two points | focal loss | 2.7 | 5.6 | 0.96 |
| ResNet50 | Added dropout after BN | two points | focal loss | 2.9 | 5.6 | 0.96 |

Fig. 5

| Backbone | Dropout | Age distribution representation | W1 loss function | Training age | Validation age | Gender accuracy |
|---|---|---|---|---|---|---|
| plain-shared | yes | two points | focal loss | 5.7 | 5.5 | 0.95 |
| plain-shared | deleted | two points | focal loss | 4.4 | 5.3 | 0.92 |
| ResNet50 | deleted | two points | focal loss | 2.7 | 5.6 | 0.96 |
| EfficientNetB4 | deleted | Gaussian | focal loss | 2.5 | 5.0 | 0.96 |

Fig. 7

AGE AND GENDER ESTIMATION USING A CONVOLUTIONAL NEURAL NETWORK

BACKGROUND

Technical Field

The instant disclosure is related to human attribute recognition and more specifically to human age and gender recognition.

Background

Currently, age and gender estimation has proven difficult based in part on insufficient datasets with age and gender labels, variations of expression, pose, and illumination and typically utilize a large computationally resource to perform adequately.

Predicting human age and gender, two of the intrinsic facial attributes in unconstrained conditions may increase in importance in real-world applications including human-computer interaction and autonomous driving performed with much more constrained computational resources.

SUMMARY

An example method of age and gender estimation, including receiving an input image, detecting a facial image within the input image, estimating a head pose based on a set of facial image intensities of the facial image, wherein the head pose is expressed as a yaw, a pitch and a roll, determining whether the yaw, the pitch and the roll of the head pose is less than a predetermined threshold, aligning the facial image if the yaw, the pitch and the roll of the head pose are less than the predetermined threshold and predicting an age and a gender of the aligned facial image.

DESCRIPTION OF THE DRAWINGS

In the drawings:

FIG. 5 is an example of an age and gender estimation utilizing various convolutional neural network models and various dropout deletions in accordance with one embodiment of the disclosure;

FIG. 7 is an example of an age and gender estimation utilizing various convolutional neural network models in accordance with one embodiment of the disclosure.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
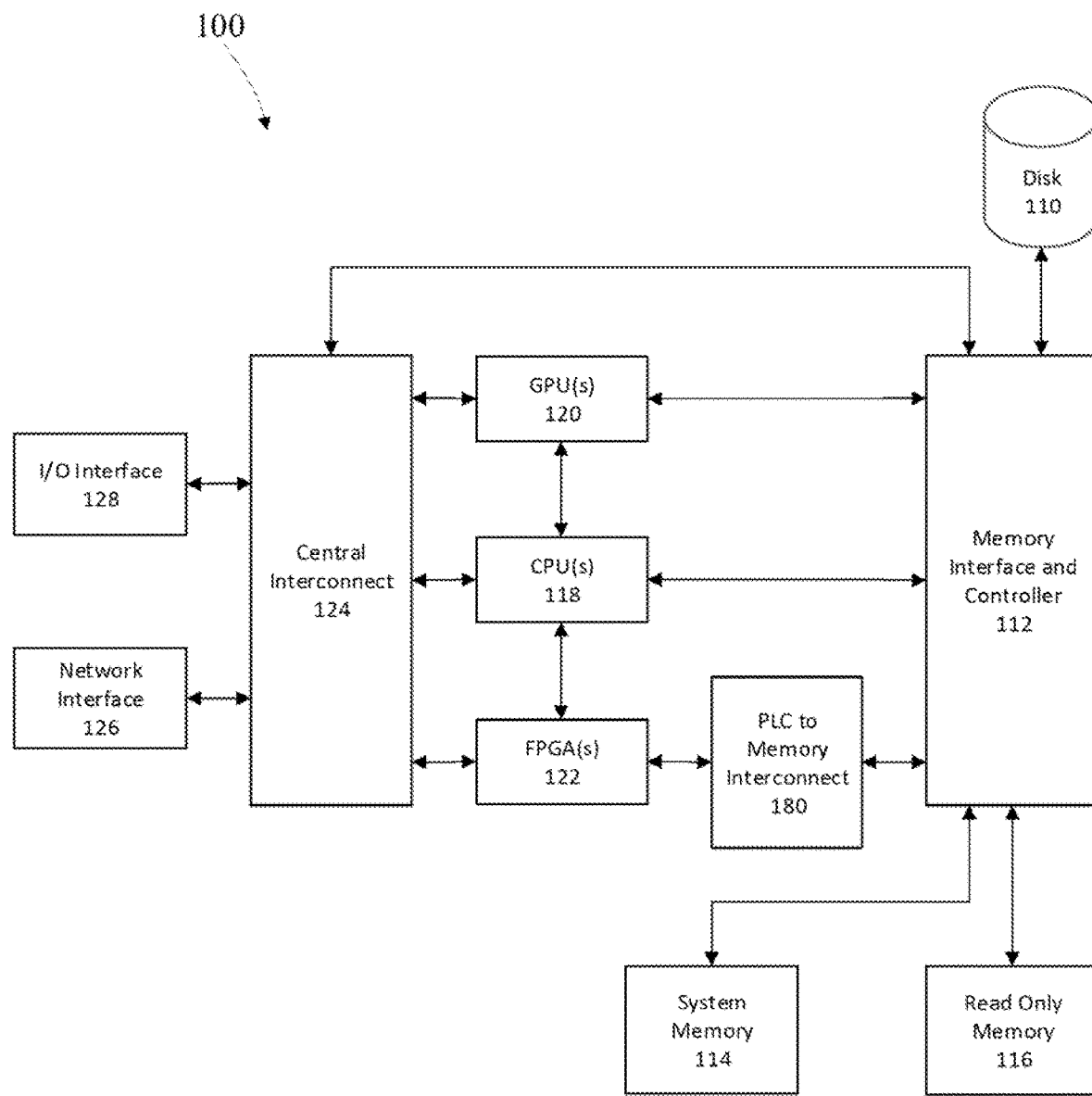
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120 central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
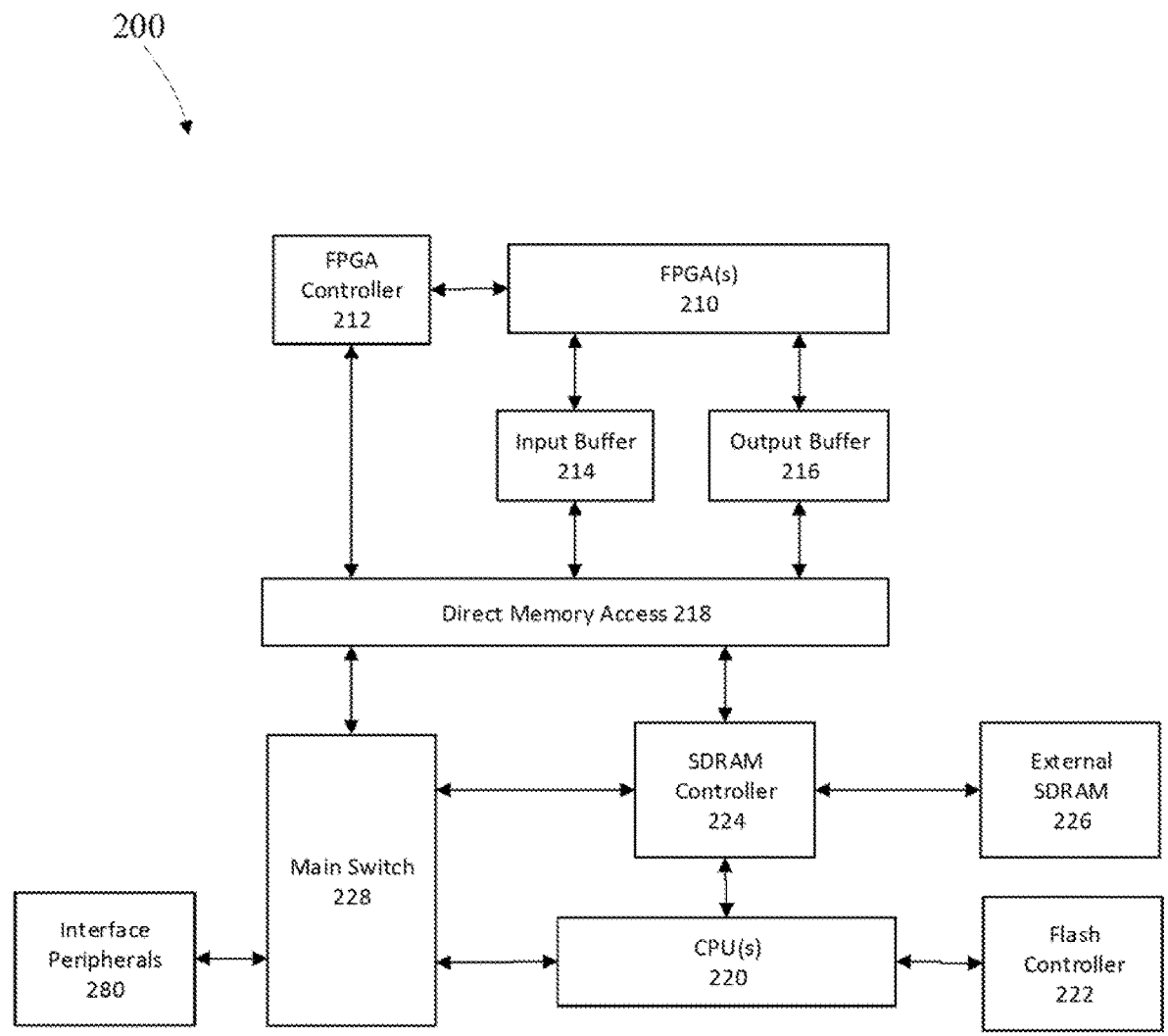
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

This disclosure describes a computationally efficient framework that may estimate age and gender to predict age and gender from red-blue-green (RGB) and infra-red (IR) images or videos. A head pose estimation module controls the subject's head pose before performing age and gender estimation. A large combination of datasets was utilized in training the model to avoid missing age groups and races and the accuracy of the proposed model may have been increased to allow different network architectures to trade off the preference between higher accuracy and faster computation.

Age and gender classification may provide an increasing role in computer vision particularly since the rise of autonomous driving. Given the large variations in unconstrained images, manually designed features utilized by traditional methods are unsatisfactory. Convolutional neural networks have eased this issue somewhat due to their powerful feature representation. For CNNs to achieve higher accuracy, the general tendency has been more complex and computationally heavier systems thus increasing computational cost. One possible challenge for deploying large models in robotics, self-driving car, and embedded vision applications is the limited computation capability of embedded platforms, which prevents them from being utilized in computationally heavy and deep CNNs. Current models that have pursued lightweight computational utilization pay the expense of accuracy, one factor to be pursued is to increase performance while computational cost.

To train based on large-scale datasets and efficiently trade-off between computation and accuracy, an age and gender estimation framework is proposed that is based on lightweight deep learning neural networks based on four mixed large public datasets (Asian Face Age Dataset, The All-Age-Faces Dataset, UTKFace dataset and IMDB-WIKI datasets) as training data with a wide range of age labels, gender annotations, and diverse ethnicity.

Structural adjustments to current age and gender CNNs have been made including dropout deletion, changing the backbone, loss function, and age distribution representation.

A head pose estimation system controls the processing of age and gender estimation based on the subject's head pose. Due to the limitations of available datasets and the inherent challenges caused by occlusions in large head poses, the age and gender estimation is limited to within near-frontal head poses. If the yaw, pitch, or roll angles of the head pose are bigger than their thresholds, age and gender estimation will not be processed.

Figure 3:
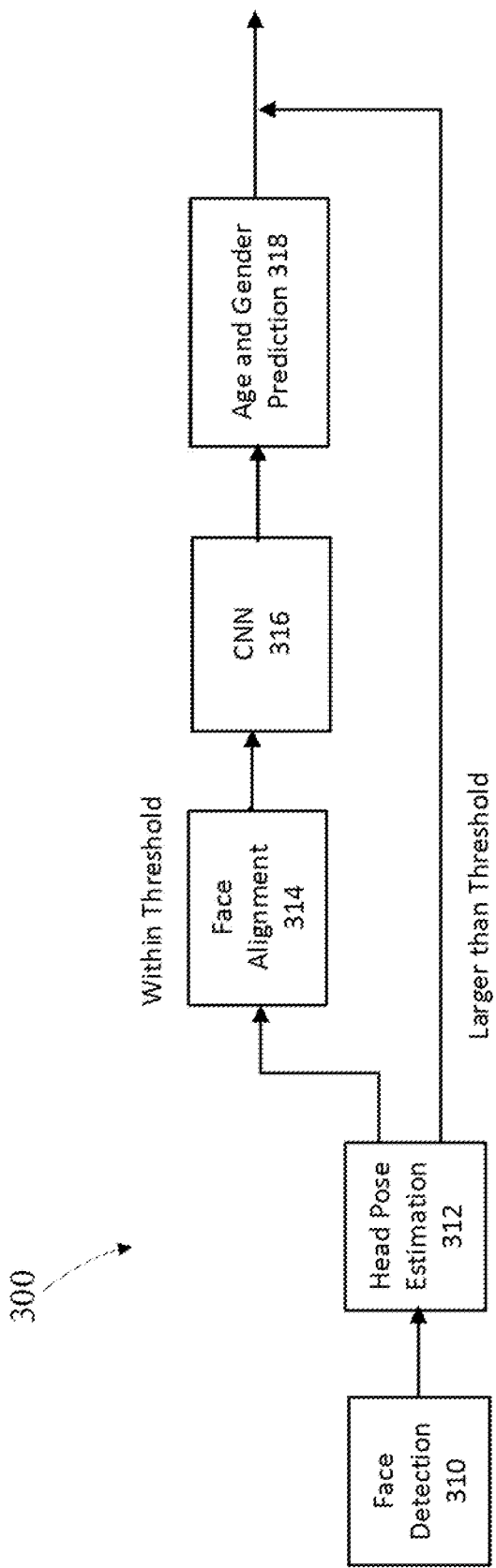
FIG. 3 is an example flow of age and gender estimation in accordance with one embodiment of the disclosure.

The process of age and gender estimation proposed solution is shown in FIG. 3 300. In preprocessing for facial detection 310, the subject's face is detected using five-point face landmarks. From the detected face, the subject's head pose may be estimated 312 using the predicted intrinsic Euler angles, i.e., yaw, pitch, and roll, based on which the system decides if the age and gender estimation module should be processed or not. If the Euler angles, i.e., the yaw, pitch and roll are within the threshold a facial alignment 314 is performed. The system uses five-point landmarks to first do face alignment to establish correspondence among different faces. The aligned facial image is input into a convolutional neural network 316 to complete the task of feature extraction which renders an age and a gender prediction 318. In the CNNs setup, we improved the original plain CNN and replaced it with ResNet50 and EfficientNetB4.

To train the CNN model, four public human face datasets were fused for the data preprocessing stage to achieve data balance and improve diversity. The human face datasets in one example include the Asian Face Age Dataset (AFAD), which includes more than 160 K Asian facial images and age labels, The All-Age-Faces Dataset (Asia) which contains 13,322 face images (mostly Asian) distributed across all ages (from 2 to 80), including 7381 females and 5941 males, UTKFace dataset with long age span (range from 0 to 116 years old) and consisting of over 20,000 face images with annotations of age, gender, and ethnicity and IMDB-WIKI datasets which took 460,723 face images from 20,284 celebrities from IMDB website and 62,328 from Wikipedia as the training dataset. The mixed dataset covers more diversified face cases and races, making it suitable for training a generic age and gender estimation module.

Figure 4:
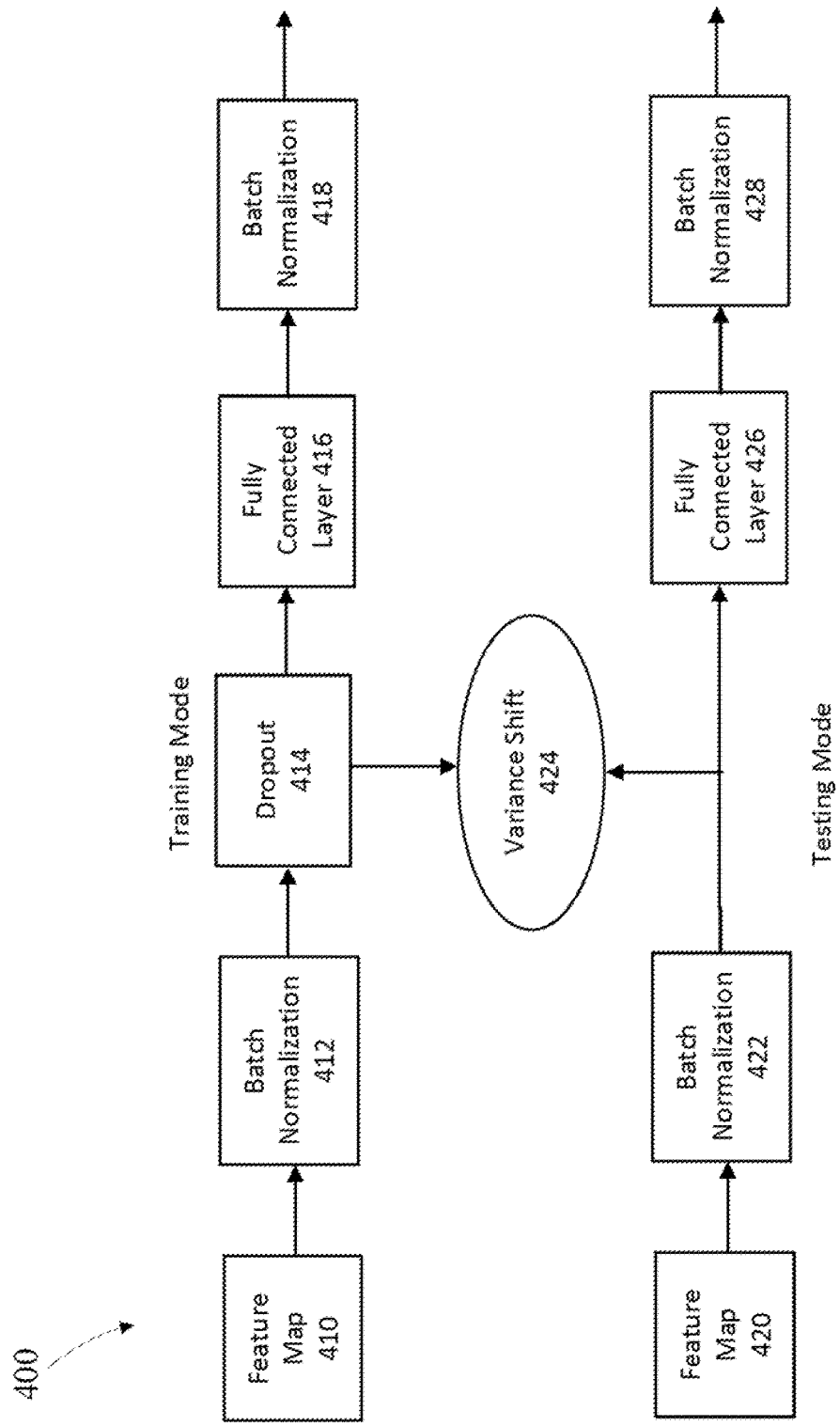
FIG. 4 is an example of an age and gender estimation network in accordance with one embodiment of the disclosure.

FIG. 4 depicts an example of training and testing 400, the neural variance of feature maps may be caused by the dropout unit being placed before the fully connected layer and batch normalization (BN). The mismatch of variance may cause numerical instability.

FIG. 5 indicates 500 that the model may attain higher accuracy without the utilization of dropout. The dropout before the fully connected layer and hatch normalization was removed in subsequent examples due in part to variance shift. In one example, dropout was moved after batch normalization and possibly indicated that the removal of dropout resulted in higher performance of the original model.

To determine a more precise classification of large age and gender dataset, the original plain backbone was replaced in other example embodiments with ResNet-50-C4 and EfficientNetB4. Both ResNet-50-C4 and EfficientNetB4 indicated a significantly improved performance. Such net architectures may be utilized when the embedded platform has more computational resources. Within the age and gender model the original two points distribution was replaced with a fully connected layer which was inserted in between the feature layer and the regression layer. This example modification to a fully connected layer allowed for age estimation with Gaussian distribution and obtained the best results.

Figure 6:
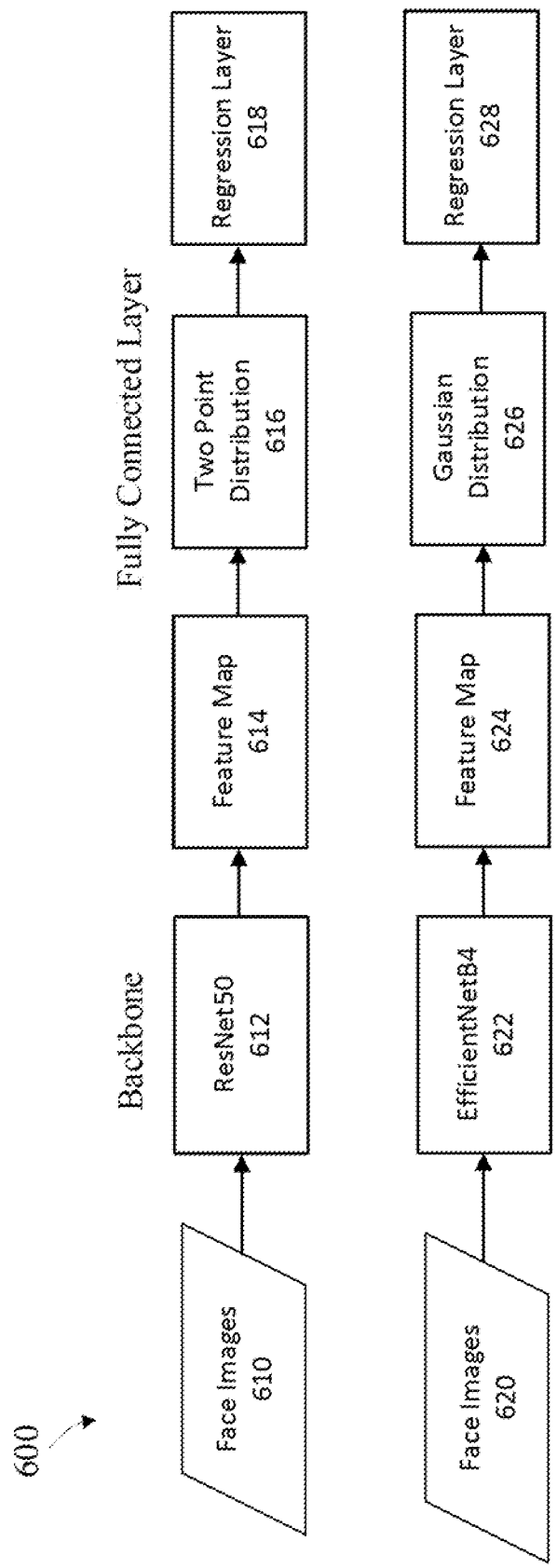
FIG. 6 is a second example of an age and gender estimation network in accordance with one embodiment of the disclosure.

FIG. 6 depicts two example models 600, in one model facial images 610 are input into a ResNet50 backbone 612, a feature map 614 is found and in the fully connected layer a two-point distribution 616 is utilized for age and gender modeling which is then sent to a regression layer 618.

The second example model of FIG. 6 inputs facial images 620 into an EfficientNetB4 backbone 622, a feature map 624 is determined, a gaussian distribution 626 is utilized for age and gender modeling which is then sent to regression layer 628.

FIG. 7 depicts a comparison table 700 among computationally light backbone models and two heavier backbone models.

Figure 8:
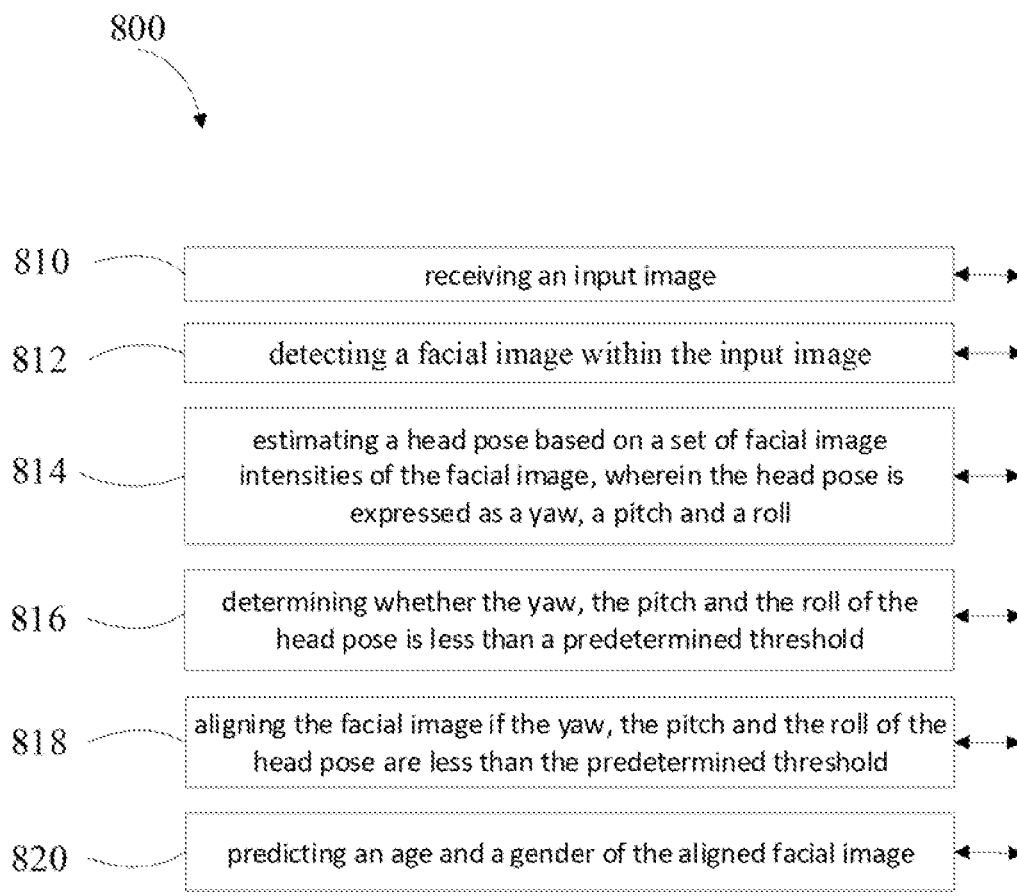
FIG. 8 is an example method of age and gender estimation in accordance with one embodiment of the disclosure.

FIG. 8 depicts an example method of age and gender estimation, comprising receiving 810 an input image, detecting 812 a facial image within the input image and estimating 814 a head pose based on a set of facial image intensities of the facial image, wherein the head pose is expressed as a yaw, a pitch and a roll. The method further includes determining 816 whether the yaw, the pitch and the roll of the head pose is less than a predetermined threshold, aligning 818 the facial image if the yaw, the pitch, and the roll of the head pose are less than the predetermined threshold and predicting 820 an age and a gender of the aligned facial image.

The method may further include retransforming and or reorganizing a set of inverse transform coefficients of the inverse block processing. The entropy decoding may be processed by at least one of Huffman decoding and Arithmetic decoding. A de-quantization factor applied to de-quantization may be based on a coefficient criticality and or on a set of coefficient frequencies. The inverse block processing may perform reassembly of the de-quantized dataset into a set of regular blocks. The inverse transformation may include a luminance, a blue-green difference, a red-green difference and a first green to second green difference. The decompressed image dataset may include at least three color channels.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described, above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

The previous description is provided to enable any person skilled in the an to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation, or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration," Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein b reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above-described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of age and gender estimation, comprising:
    receiving an input image;
    detecting a facial image within the input image;
    estimating a head pose based on a set of facial image intensities of the facial image, wherein the head pose is expressed as a yaw, a pitch, and a roll;
    determining whether the yaw, the pitch, and the roll of the head pose is less than a predetermined threshold;
    aligning the facial image if the yaw, the pitch, and the roll of the head pose are less than the predetermined threshold; and
    predicting au age and a gender of the aligned facial image.

2. The method of age and gender estimation of claim 1, wherein the alignment of the facial image is performed using five-point facial landmarks.

3. The method of age and gender estimation of claim 1, wherein the predetermined threshold limits the head pose to near-frontal head poses.

4. The method of age and gender estimation of claim 1, further comprising extracting features of the aligned facial image.

5. The method of age and gender estimation of claim 1, wherein the prediction of the age and the gender is performed via a convolutional neural network.

6. The method of age and gender estimation of claim 5, wherein the convolutional neural network utilized is one of ResNet-50-C4 and EfficientNetB4.

7. The method of age and gender estimation of claim 5, wherein the convolutional neural network includes a batch normalization, a dropout after the batch normalization, a fully connected layer after the dropout and a second batch normalization.

8. The method of age and gender estimation of claim 5, wherein the convolutional neural network includes a feature mapping of the aligned facial image, a two-point age distribution within a fully connected layer and a regression layer.

9. The method of age and gender estimation of claim 5, wherein the convolutional neural network includes a feature mapping of the aligned facial image, a gaussian age distribution within a fully connected layer and a regression layer.

10. The method of age and gender estimation of claim 1, wherein age estimation is provided as a gaussian distribution.

11. The method of age and gender estimation of claim 1, wherein the detecting of the facial image is performed using five-point facial landmarks.

* * * * *